US009361004B2

(12) United States Patent
Banatwala et al.

(10) Patent No.: US 9,361,004 B2
(45) Date of Patent: *Jun. 7, 2016

(54) INDICATING ORGANIZATION OF VISITOR ON USER INTERFACE OF USER ENGAGED IN COLLABORATIVE ACTIVITY WITH VISITOR

(71) Applicant: International Business Machines Corporation, Armonk, NY (US)

(72) Inventors: Mustansir Banatwala, Hudson, NH (US); David A. Brooks, Arlington, MA (US); David L. Durazzano, Hooksett, NH (US); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 338 days.

This patent is subject to a terminal disclaimer.

(21) Appl. No.: 14/066,907

(22) Filed: Oct. 30, 2013

(65) Prior Publication Data

US 2014/0215564 A1    Jul. 31, 2014

Related U.S. Application Data

(63) Continuation of application No. 13/749,902, filed on Jan. 25, 2013, now Pat. No. 9,104,297.

(51) Int. Cl.
*G06F 3/00* (2006.01)
*G06F 3/0484* (2013.01)
*H04L 29/06* (2006.01)
*H04L 29/08* (2006.01)
*H04M 3/42* (2006.01)

(52) U.S. Cl.
CPC .............. *G06F 3/0484* (2013.01); *H04L 63/08* (2013.01); *H04L 63/0815* (2013.01); *H04L 65/403* (2013.01); *H04L 67/306* (2013.01); *H04M 3/42042* (2013.01)

(58) Field of Classification Search
CPC ...... H04L 51/04; H04L 12/581; H04W 12/06
See application file for complete search history.

(56) References Cited

U.S. PATENT DOCUMENTS

| 7,673,004 | B1 | 3/2010 | Sherstinsky et al. |
| 8,335,994 | B2 | 12/2012 | So |
| 8,549,412 | B2 | 10/2013 | Brezina et al. |
| 8,578,448 | B2 | 11/2013 | McGloin et al. |
| 8,640,035 | B2 | 1/2014 | Pabla et al. |
| 2003/0076353 | A1 | 4/2003 | Blackstock et al. |
| 2004/0196315 | A1 | 10/2004 | Swearingen et al. |
| 2005/0222890 | A1 | 10/2005 | Cheng et al. |
| 2009/0265106 | A1 | 10/2009 | Bearman et al. |
| 2011/0219050 | A1 | 9/2011 | Ly et al. |
| 2011/0271210 | A1 | 11/2011 | Jones et al. |
| 2012/0215686 | A1 | 8/2012 | Lauzon |
| 2012/0316902 | A1 | 12/2012 | Kumar et al. |

OTHER PUBLICATIONS

Office Action for U.S. Appl. No. 13/749,902 dated Oct. 8, 2014, pp. 1-13.

*Primary Examiner* — Omar Abdul-Ali
(74) *Attorney, Agent, or Firm* — Robert A. Voigt, Jr.; Winstead, P.C.

(57) ABSTRACT

A method, system and computer program product for indicating an organization of a visitor on a user interface of a user engaged in collaborative activity with the visitor. The visitor attempting to engage in a collaborative action (e.g., participating in an online meeting, sharing files) with a user from a different organization is authenticated to confirm that the visitor has the right to engage in collaborative activity with the user from the different organization. The identification of the organization of the visitor is extracted from the information used to authenticate the visitor. The identification of the organization of the visitor is then displayed on the user interface of the user engaging in the collaborative action with the visitor. In this manner, the organization of the visitor is easily discoverable by the user without requiring the user to perform a time consuming search to determine the organization of the visitor.

6 Claims, 6 Drawing Sheets

INDICATING ORGANIZATION OF VISITOR ON USER INTERFACE OF USER ENGAGED IN COLLABORATIVE ACTIVITY WITH VISITOR

CROSS-REFERENCE TO RELATED APPLICATIONS

The present application is a continuation application of pending U.S. patent application Ser. No. 13/749,902, which was filed on Jan. 25, 2013, which is assigned to the assignee of the present invention. The present application claims priority benefits to U.S. patent application Ser. No. 13/749,902.

TECHNICAL FIELD

The present invention relates generally to social network services, and more particularly to indicating the organization of a visitor on the user interface of a user engaged in collaborative activity (e.g., chatting, participating in an online meeting, sharing files, entering data in forums and wikis, community membership) with the visitor.

BACKGROUND

A social network service is an online service, platform or site that focuses on building and reflecting of social networks or social relations among people (e.g., those who share interests and/or activities). A social network service essentially consists of a representation of each user (often a profile), his/her social links, and a variety of additional services. Most social network services are web based and provide means for users to interact over the Internet, such as by e-mail and instant messaging. Social networking sites allow users to share ideas, activities, events, and interests within their individual networks.

In a multi-tenant social networking environment, where a tenant is an organization, a user of an organization may want to engage in collaborative activity (e.g., chatting, participating in an online meeting, sharing files, entering data in forums and wikis, community membership) with users who are visitors from other organizations. In such collaborative activity, information may be shared, and as a result, the user may want to know if the user is a visitor, and if so, the organization of the visitor, prior to sharing information.

Currently, when a user of an organization is engaged in collaborative activity with a user who is a visitor from another organization, the organization of the visitor is not readily available to the user. Instead, the user may have to perform a time consuming search to determine the organization of the visitor, such as by searching for identification information, such as a business card in electronic format or a profile that hopefully includes the organization of the visitor.

As a result, there is not currently an easy and efficient manner for the user to discover the organization of a visitor engaged in collaborative activity with the user.

BRIEF SUMMARY

In one embodiment of the present invention, a method for indicating an organization of a visitor on a user interface of a user engaged in collaborative activity with the visitor comprises authenticating a first user from an organization to be eligible to engage in a collaborative action with a second user from a different organization. The method further comprises extracting an identification of the organization of the first user from information used to authenticate the first user. In addition, the method comprises displaying, by a processor, the identification of the organization of the first user on a user interface of the second user in response to the first user engaging in the collaborative action with the second user.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for indicating an organization of a visitor on a user interface of a user engaged in collaborative activity with the visitor. In one embodiment of the present invention, the visitor attempting to engage in a collaborative action (e.g., chatting, participating in an online meeting, sharing files, entering data in a forum, entering data in a wiki, community membership) with a user from a different organization is authenticated to confirm that the visitor has the right to engage in collaborative activity with the user from the different organization. The identification of the organization of the visitor is extracted from the information used to authenticate the visitor. The identification of the organization of the visitor is then displayed on the user interface of the user engaging in the collaborative action with the visitor. In this manner, the organization of the visitor is easily discoverable by the user as it is presented on the user interface of the user's client device without requiring the user to perform a time consuming search to determine the organization of the visitor.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
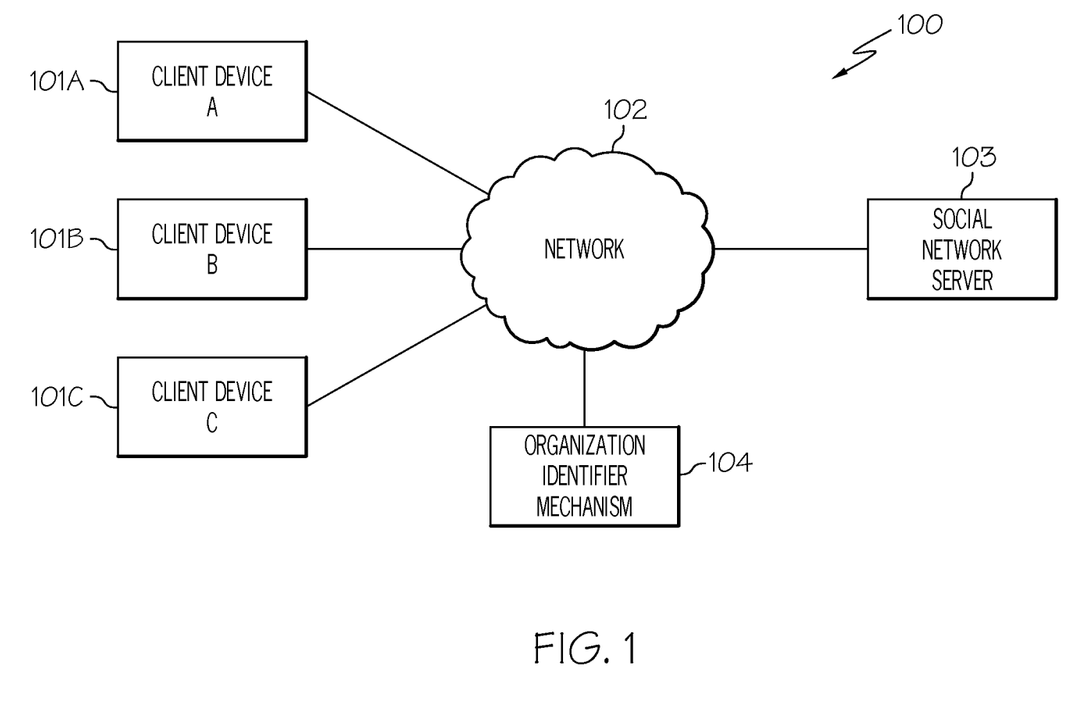
FIG. 1 illustrates a multi-tenant social network system configured in accordance with an embodiment of the present invention.

Referring now to the Figures in detail, FIG. 1 illustrates a multi-tenant social network system 100 configured in accordance with an embodiment of the present invention. Referring to FIG. 1, social network system 100 includes a community of users of various organizations (tenants) using client devices 101A-101C (identified as "Client Device A," "Client Device B," and "Client Device C," respectively, in FIG. 1) to be involved in multi-tenant social network system 100. Client devices 101A-101C may collectively or individually be referred to as client devices 101 or client device 101, respectively. Each user of client device 101 may be a worker/employee for a unique organization or multiple users of client devices 101 may be workers/employees for the same organization. For example, users of client devices 101A-101B may be workers/employees for the same organization while the user of client device 101C is a worker/employee of a different organization. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 103 is connected to network 102 by wire or wirelessly. Social network server 103, as used herein, is configured to enable various collaborative activities as discussed herein. While FIG. 1 illustrates a single social network server 103, it is noted for clarity that multiple servers may be used to implement the social networking and/or microblogging service.

System 100 further includes an organization identifier mechanism 104 connected to network 102 by wire or wirelessly. Organization identifier mechanism 104 is configured to indicate an organization of a visitor on a user interface of a user engaged in collaborative activity with the visitor as discussed in further detail below. A description of the hardware configuration of organization identifier mechanism 104 is provided below in connection with FIG. 2.

System 100 is not to be limited in scope to any one particular network architecture. System 100 may include any number of clients 101, networks 102, social network servers 103 and organization identifier mechanisms 104. Furthermore, in one embodiment, organization identifier mechanism 104 may be part of social network server 103.

Figure 2:
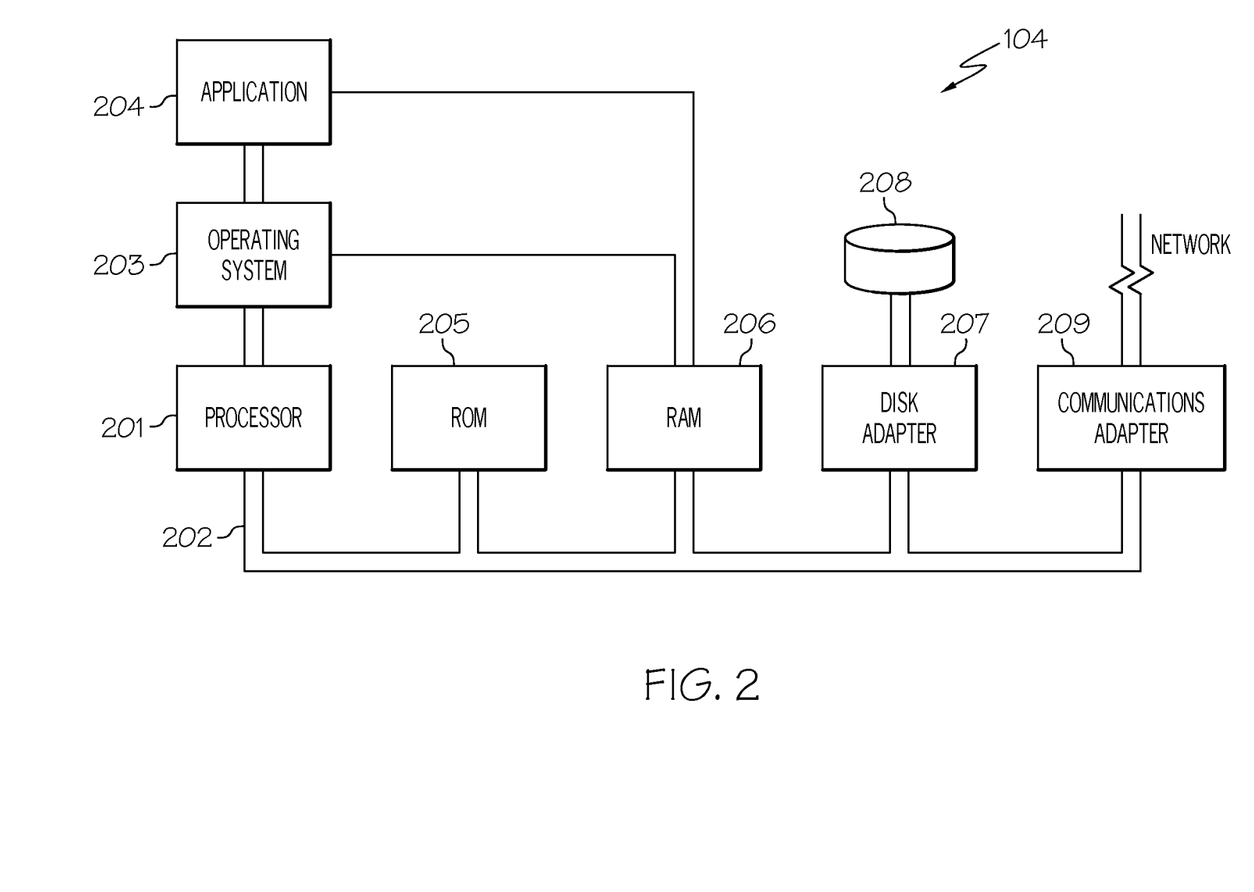
FIG. 2 illustrates a hardware configuration of an organization identifier mechanism configured in accordance with an embodiment of the present invention.

Referring now to FIG. 2, FIG. 2 illustrates a hardware configuration of organization identifier mechanism 104 (FIG. 1) which is representative of a hardware environment for practicing the present invention. Referring to FIG. 2, organization identifier mechanism 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for indicating an organization of a visitor on a user interface of a user engaged in collaborative activity with the visitor, as discussed further below in association with FIGS. 3-6.

Referring again to FIG. 2, read-only memory ("ROM") 205 is coupled to system bus 202 and includes a basic input/output system ("BIOS") that controls certain basic functions of organization identifier mechanism 104. Random access memory ("RAM") 206 and disk adapter 207 are also coupled to system bus 202. It should be noted that software components including operating system 203 and application 204 may be loaded into RAM 206, which may be organization identifier mechanism's 104 main memory for execution. Disk adapter 207 may be an integrated drive electronics ("IDE") adapter that communicates with a disk unit 208, e.g., disk drive. It is noted that the program for indicating an organization of a visitor on a user interface of a user engaged in collaborative activity with the visitor, as discussed further below in association with FIGS. 3-6, may reside in disk unit 208 or in application 204.

Organization identifier mechanism 104 may further include a communications adapter 209 coupled to bus 202. Communications adapter 209 interconnects bus 202 with an outside network (e.g., network 102 of FIG. 1) thereby allowing organization identifier mechanism 104 to communicate with client devices 101 and social network server 103.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, in a multi-tenant social networking environment, where a tenant is an organization, a user of an organization may want to engage in collaborative activity (e.g., chatting, participating in online meeting, sharing files, entering data in forums and wikis, community membership) with users who are visitors from other organizations. In such collaborative activity, information may be shared, and as a result, the user may want to know if the user is a visitor, and if so, the organization of the visitor, prior to sharing information. Currently, when a user of an organization is engaged in collaborative activity with a user who is a visitor from another organization, the organization of the visitor is not readily available to the user. Instead, the user may have to perform a time consuming search to determine the organization of the visitor, such as by searching for identification information, such as a business card in electronic format or a profile that hopefully includes the organization of the visitor. As a result, there is not currently an easy and efficient manner for the user to discover the organization of a visitor engaged in collaborative activity with the user.

Figure 3:
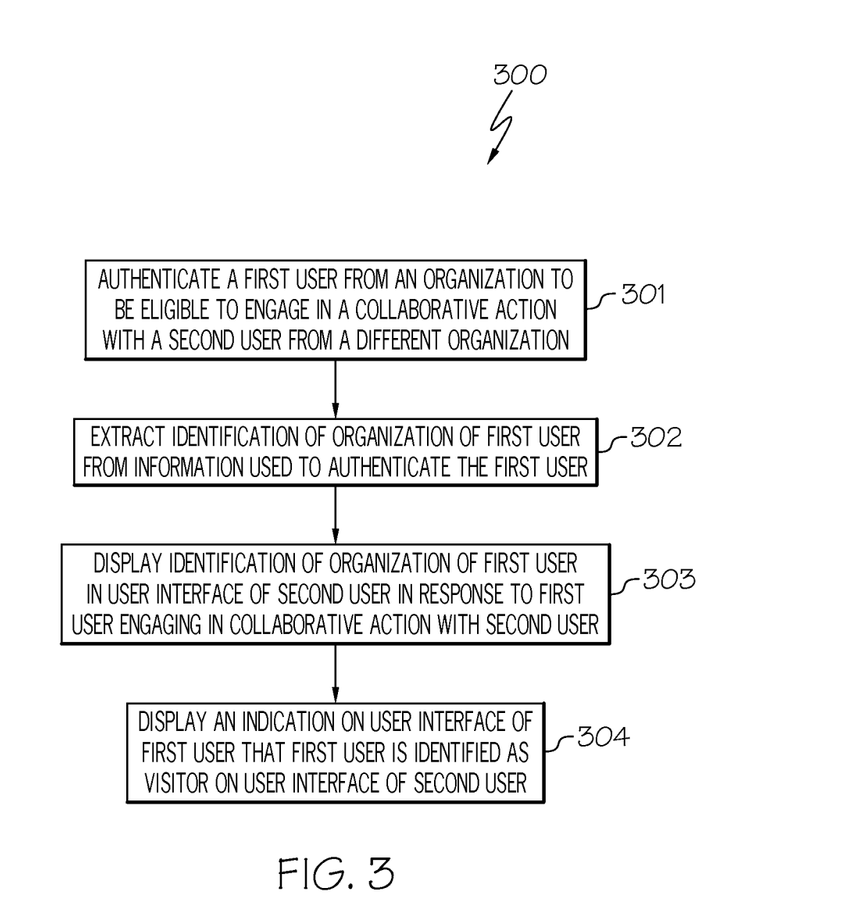
FIG. 3 is a flowchart of a method for indicating the organization of a visitor on a user interface of a user engaged in collaborative activity with the visitor in accordance with an embodiment of the present invention.
Figure 4:
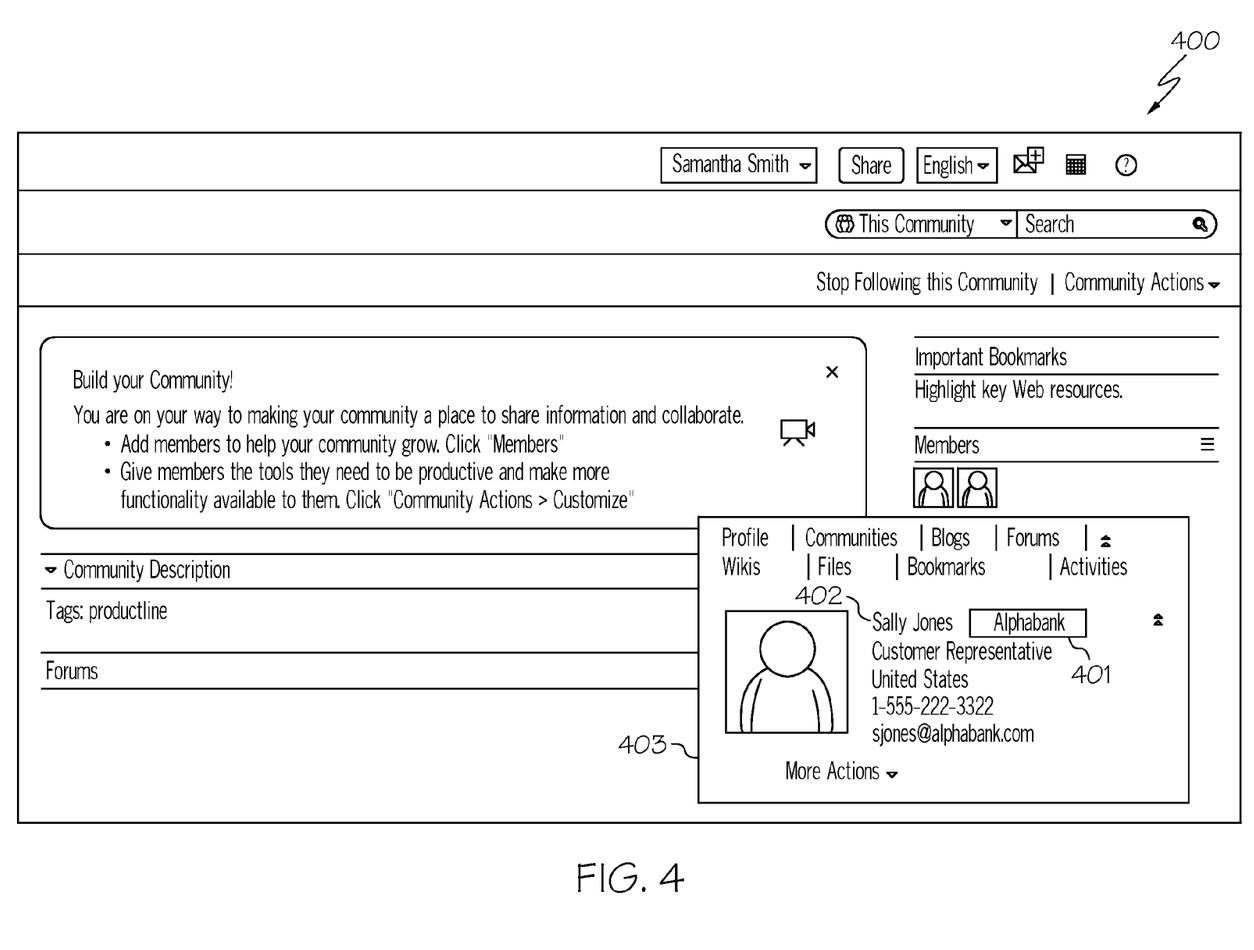
FIG. 4 is a screen shot of a user interface illustrating the display of an identification of the organization of the visitor as well as an identification of the visitor engaged in collaborative activity with the user in accordance with an embodiment of the present invention.
Figure 5:
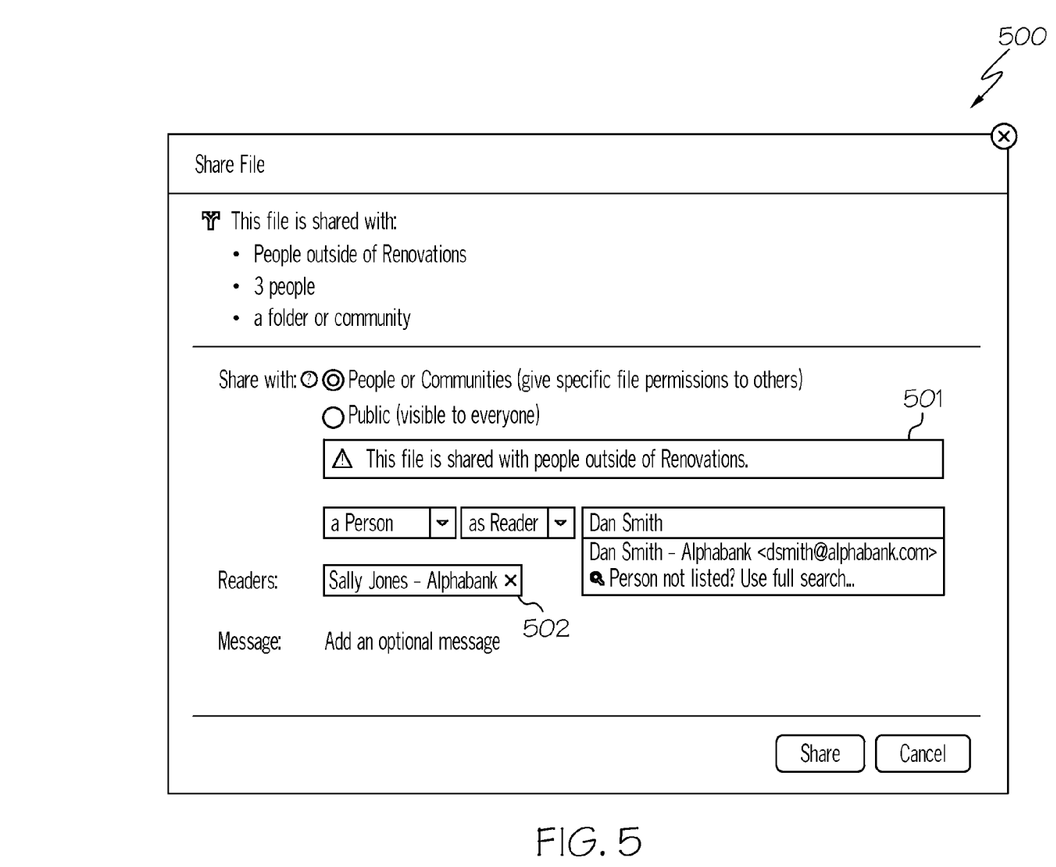
FIG. 5 is a screen shot of the user interface illustrating the display of an identification of the organization of the visitor as well as an identification of the visitor prior to the user sharing content with the visitor in accordance with an embodiment of the present invention.
Figure 6:
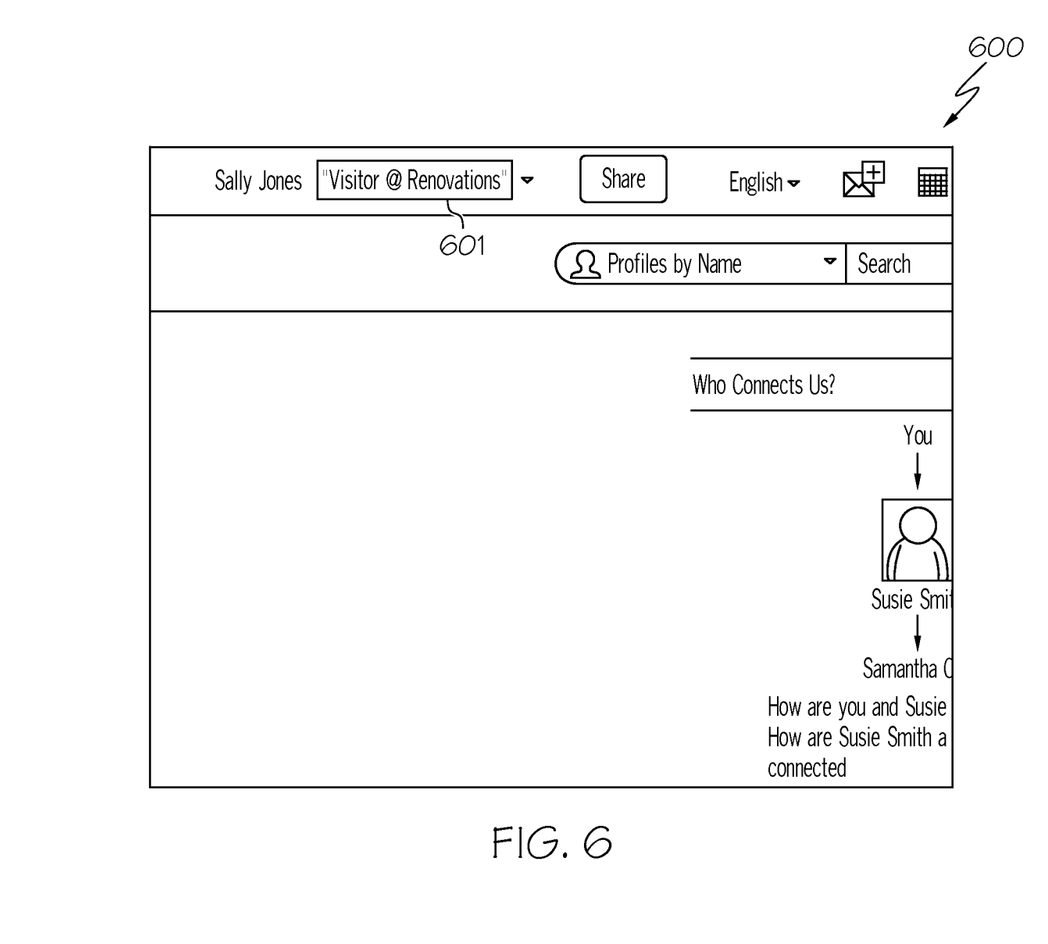
FIG. 6 is a screen shot of the user interface on the visitor's client device illustrating the display of an indication that the visitor is being indicated as a visitor on the user interface of the user engaged in collaborative activity with the visitor in accordance with an embodiment of the present invention.

The principles of the present invention provide a means for automatically indicating the organization of a visitor on a user interface of a user engaged in collaborative activity (e.g., chatting, participating in an online meeting, sharing files, entering data in a forum, entering data in a wiki, community membership) with the visitor as discussed further below in association with FIGS. 3-6. FIG. 3 is a flowchart of a method for indicating the organization of a visitor on a user interface of a user engaged in collaborative activity with the visitor. FIG. 4 is a screen shot of the user interface on client device 101 (FIG. 1) illustrating a display of an identification of the organization of the visitor as well as an identification of the visitor engaged in collaborative activity with the user. FIG. 5 is a screen shot of the user interface on client device 101 illustrating a display of an identification of the organization of the visitor as well as an identification of the visitor prior to the user sharing content with the visitor. FIG. 6 is a screen shot of the user interface on the visitor's client device 101 illustrating a display of an indication that the visitor is being indicated as a visitor on the user interface of the user engaged in collaborative activity with the visitor.

As stated above, FIG. 3 is a flowchart of a method 300 for indicating the organization of a visitor on a user interface of a user engaged in collaborative activity with the visitor in accordance with an embodiment of the present invention.

Referring to FIG. 3, in conjunction with FIGS. 1-2, in step 301, organization identifier mechanism 104 authenticates a first user (e.g., user of client device 101A) from an organization to be eligible to engage in a collaborative action (e.g., chatting, participating in an online meeting, sharing files, entering data in a forum, entering data in a wiki, community membership) with a second user (e.g., user of client device 101B) from a different organization. In order for a user to engage in collaborative activity with another user, the user needs to be authenticated prior to being allowed to engage in collaborative activity. In one embodiment, the first user provides a login identifier to organization identifier mechanism 104 in order to engage in a collaborative action with the second user in the second user's enterprise/organization space. There are various means for authenticating a user, including, but not limited to, knowledge-based (e.g., login identifier, password), possession-based (e.g., security token, smart card) and biological or behavior biometric traits (e.g., keystroke dynamics, signature) authentication factors. The principles of the present invention are not limited to implementing the exemplary authentication factors listed above but may implement any authentication factor that may be used to authenticate a user to engage in collaborative activity.

In step 302, organization identifier mechanism 104 extracts an identification of the organization (e.g., "Alphabank") of the first user (e.g., user of client device 101A) from the information used to authenticate the first user during the authentication of the first user. In one embodiment, organization identifier mechanism 104 further extracts an identification of the first user, such as the full name of the first user, from the information used to authenticate the first user.

In step 303, organization identifier mechanism 104 displays the identification of the organization of the first user (e.g., "Alphabank") in a user interface of the second user (e.g., user interface of client device 101B) in response to the first user (e.g., user of client device 101A who is a visitor to the second user's community space) engaging in collaborative action with the second user (e.g., user of client device 101B) as illustrated in FIG. 4. In this manner, the organization of the visitor is easily discoverable by the user as it is presented on the user interface of the user's client device 101 without requiring the user to perform a time consuming search to determine the organization of the visitor. In one embodiment, organization identifier mechanism 104 further displays the identification of the first user/visitor (e.g., "Sally Jones") in the user interface of the second user as further illustrated in FIG. 4. As discussed herein, the first user is identified as a "visitor" from the perspective of the second user since the first user is a visitor to the second user's community space.

FIG. 4 is a screen shot of the user interface 400 on client device 101 illustrating a display of an identification of the organization of the visitor as well as an identification of the visitor engaged in collaborative activity with the user in accordance with an embodiment of the present invention. Referring to FIG. 4, FIG. 4 illustrates the organization of the visitor 401 (e.g., "Alphabank") as well as the visitor's name 402 (e.g., "Sally Jones") are displayed in an electric business card format 403 on the user interface 400 of the second user (e.g., "Samantha Smith"). As further illustrated in FIG. 4, the electronic business card 403 may include various information about the visitor, including e-mail address and work phone number.

Furthermore, in one embodiment, the identification of the organization of the visitor (i.e., organization of the first user) as well as the identification of the visitor may be displayed on the user interface of the user (i.e., the second user) prior to sharing content with the visitor as illustrated in FIG. 5.

FIG. 5 is a screen shot of the user interface 500 on client device 101 illustrating a display of an identification of the organization of the visitor as well as an identification of the visitor prior to the user sharing content with the visitor in accordance with an embodiment of the present invention.

Referring to FIG. 5, FIG. 5 illustrates a notice 501 being displayed on the user interface 500 of the second user (e.g., user of client device 101B) indicating that content is about to be shared with users outside the community space of the second user (i.e., sharing the content with a different organization than the organization of the second user (e.g., "Renovations"). In connection with notice 501, the identification of the organization of the visitor (e.g., "Alphabank") as well as an identification of the visitor (e.g., "Sally Jones") are identified in box 502. In this manner, the second user is provided notice that the user will be sharing content with a visitor from a different organization, where the visitor and the visitor's organization are identified.

Returning to FIG. 3, in conjunction with FIGS. 1-2, in step 304, organization identifier mechanism 104 displays an indication on the user interface of the first user (e.g., user of client device 101A) informing the first user that the first user is being identified as a visitor on the user interface of the second user (e.g., user of client device 101B) as illustrated in FIG. 6.

FIG. 6 is a screen shot of the user interface 600 on the visitor's client device 101 illustrating a display of an indication that the visitor is being identified as a visitor on the user interface of the user engaged in collaborative activity with the visitor in accordance with an embodiment of the present invention.

Referring to FIG. 6, FIG. 6 illustrates an indication 601 on the user interface 600 of the first user (e.g., "Sally Jones") indicating that the first user is identified as a visitor (e.g., "Visitor @ Renovations") on the second user's user interface, where the first user is a visitor to the community space of the second user who is employed at the organization of "Renovations." In this manner, the first user will have knowledge of being recognized as a visitor to the community space of the second user.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for indicating an organization of a visitor on a user interface of a user engaged in collaborative activity with the visitor, the method comprising:
   authenticating a first user from an organization to be eligible to engage in a collaborative action with a second user from a different organization;
   extracting an identification of said organization of said first user from information used to authenticate said first user; and
   displaying, by a processor, said identification of said organization of said first user on a user interface of said second user in response to said first user engaging in said collaborative action with said second user.

2. The method as recited in claim 1 further comprising:
   displaying an indication on a user interface of said first user that said first user is identified as a visitor on said user interface of said second user.

3. The method as recited in claim 1, wherein said collaborative action comprises one of the following: chatting, participating in an online meeting, sharing files, entering data in a forum, entering data in a wiki, and community membership.

4. The method as recited in claim 1 further comprising:
   extracting an identification of said first user from information used to authenticate said first user; and
   displaying said identification of said organization of said first user and said identification of said first user on said user interface of said second user.

5. The method as recited in claim 4, wherein said identification of said organization of said first user and said identification of said first user are displayed on said user interface of said second user prior to said second user sharing content with said first user.

6. The method as recited in claim 1, wherein said identification of said organization of said first user is displayed on said user interface of said second user in an electronic business card format.

* * * * *